Feb. 17, 1942. C. A. SAWTELLE 2,273,223
BRAKE MECHANISM
Filed July 5, 1939 2 Sheets-Sheet 1
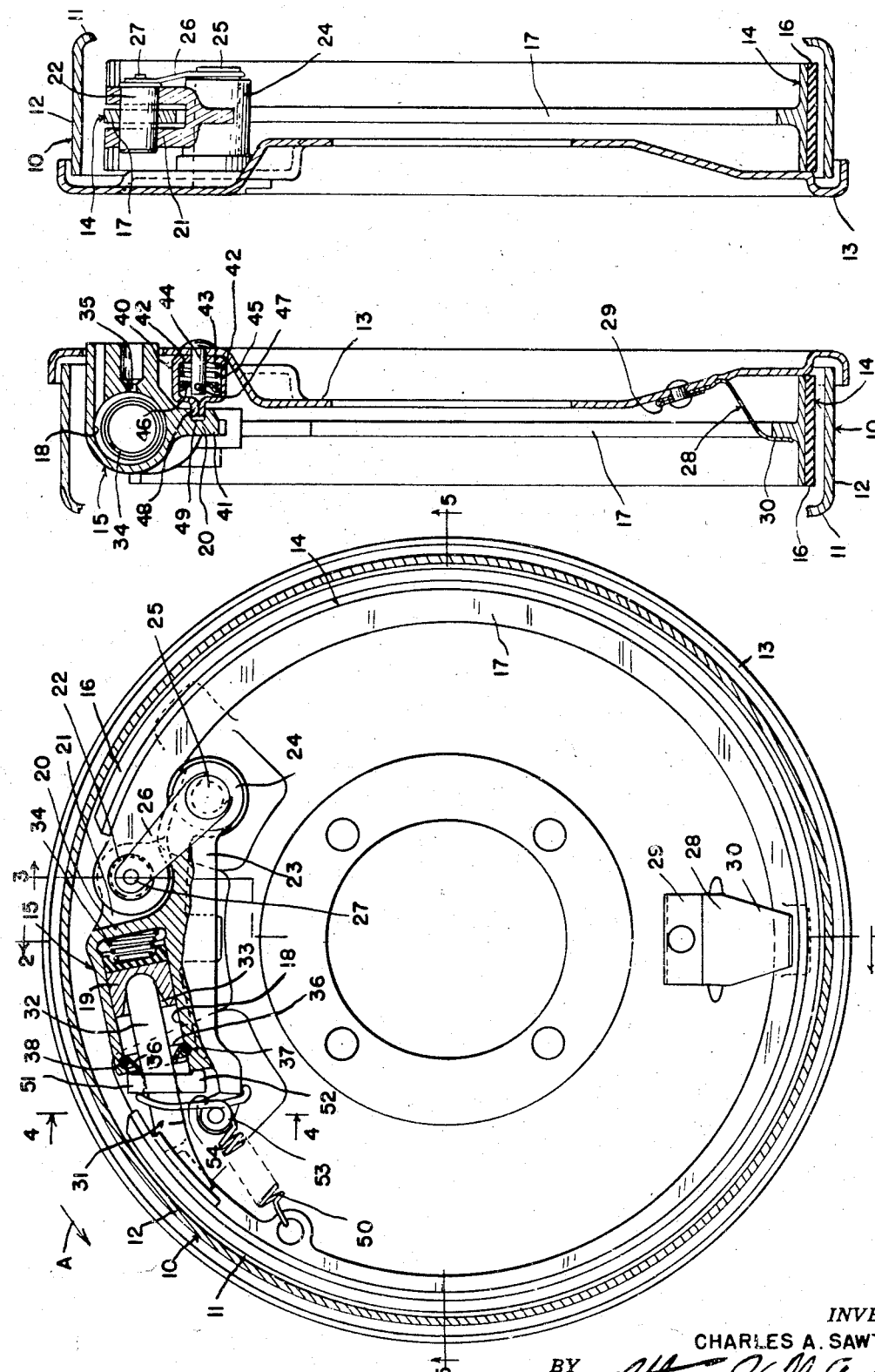
INVENTOR.
CHARLES A. SAWTELLE
BY
ATTORNEYS Feb. 17, 1942.   C. A. SAWTELLE   2,273,223
BRAKE MECHANISM
Filed July 5, 1939   2 Sheets-Sheet 2

INVENTOR.
CHARLES A. SAWTELLE
BY
ATTORNEYS

Patented Feb. 17, 1942

2,273,223

UNITED STATES PATENT OFFICE 2,273,223

BRAKE MECHANISM

Charles A. Sawtelle, Plymouth, Mich.

Application July 5, 1939, Serial No. 282,875

5 Claims. (Cl. 188—152)

This invention relates generally to brake mechanisms and refers more particularly to improvements in brakes of the type employed in connection with vehicle road engaging wheels.

One of the principal objects of this invention resides in the provision of brake mechanism composed of a relatively few simple parts capable of being inexpensively manufactured and having provision for effectively controlling the braking torque. In accordance with the present invention, the braking torque is controlled in such a manner that in installations where two or more brakes are used in conjunction with one another, equalized braking effort is applied by each brake regardless of differences in the co-efficient of friction of the brake friction means. As a result, when the brakes are installed in association with the ground engaging wheels of vehicles, smoother, more effective braking is attained and the danger of skidding of the vehicle when the brakes are applied is largely eliminated.

Another advantageous feature of the present invention resides in the novel means provided herein for automatically adjusting the brake friction means to maintain a predetermined clearance between the friction means and brake flange. In accordance with the present invention, the foregoing is accomplished by relatively simple means responsive to wear of the friction means to automatically adjust the latter to take up the increased clearance between the brake flange and friction means caused by wear of the latter. As a result, uniform operation of the brake mechanism is obtained throughout the life of the friction means and the safety factor of a vehicle equipped with brakes embodying this feature is accordingly increased.

Another object of the present invention consists in the provision of brake mechanism embodying the above features and having a relatively simple compact hydraulic actuator connected to adjacent ends of the friction means for expanding the latter into engagement with the brake flange.

A further advantageous feature of the present invention resides in the provision of brake mechanism having friction means in the form of a band reinforced by a rib gradually decreasing in width from the trailing end of the band to the leading end of the latter and imparting sufficient strength to the band to avoid chattering or excessive vibration.

The foregoing, as well as other objects, will be made more apparent as this description proceeds, especially when considered in connection with the accompanying drawings wherein:

Figure 1 is a sectional view through a brake drum illustrating brake mechanism constructed in accordance with this invention;

Figure 2 is a sectional view taken substantially on the plane indicated by the line 2—2 of Figure 1;

Figure 3 is a sectional view taken substantially on the plane indicated by the line 3—3 of Figure 1;

Figure 4:
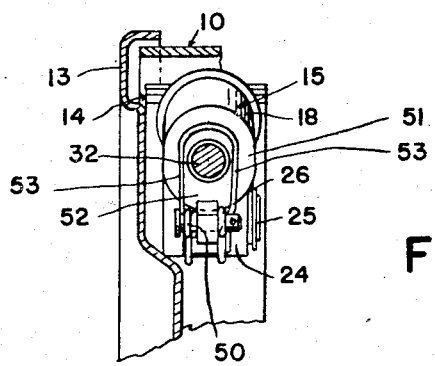
Figure 4 is a sectional view taken substantially on the plane indicated by the line 4—4 of Figure 1.
Figure 5:
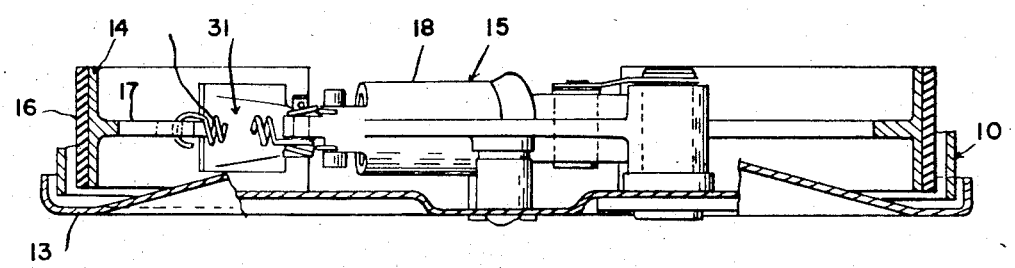
Figure 5 is a sectional view taken substantially on the plane indicated by the line 5—5 of Figure 1.

For the purpose of illustrating the present invention, I have selected a hydraulically operated brake of the band type, although it will be apparent from the following description that a number of the features of this invention are equally applicable to vehicle wheel brakes of different types regardless of the specific nature of the friction means employed and irrespective of the type of actuator used.

With the above in mind, reference will now be made to Figures 1 to 5, inclusive, of the drawings, wherein it will be noted that the reference character 10 designates a brake drum having a web 11 and having an annular brake flange 12. In accordance with conventional practice, the web 11 of the brake drum is adapted to be secured to a vehicle wheel (not shown) and the opposite side of the drum is closed by means of a backing plate 13 non-rotatably supported in any suitable manner (not shown herein).

The brake mechanism is supported on the backing plate within the drum and comprises, in general, brake friction means 14 and an actuator 15 for the brake friction means. In the present instance, the brake friction means 14 is in the form of a continuous band having spaced ends and mounted on the outboard side of the backing plate in a position to engage the inner surface of the brake flange. It will, of course, be understood that a lining 16 of friction material is secured to the outer surface of the brake band and serves to engage the inner surface of the brake flange in dependence upon actuation of the operator 15. It will also be observed from the drawings that the inner surface of the brake band is fashioned with a reinforcing rib 17 extending continuously from one end of the band to the other and gradually increasing in width in the direction of forward rotation of the brake drum. By tapering the rib in the manner illustrated, the trailing portion of the band will possess the stiffness required to effectively dampen any vibration or chatter influenced by the braking torque and, at the same time, the weight of the band is maintained to the minimum.

The actuator 15 is located within the drum between the ends of the band and, in the present instance, is of the hydraulic type. In detail, the hydraulic actuator 15 comprises a cylinder 18 and a piston 19 reciprocably mounted in the cylinder 18. The cylinder 18 is fashioned in a casting 20 having a bifurcated portion 21 extending rearwardly from the rear end of the cylinder and adapted to receive the trailing end of the brake band 14 between the furcations thereof. Upon reference to Figure 3, it will be noted that the trailing end of the brake band is pivotally connected to the casting 20 by means of a pin 22 extending through aligned openings formed in the furcations and the adjacent end portion of the brake band. Referring again to Figure 1, it will be noted that the casting 20 is provided with an extension 23 projecting rearwardly from the bifurcated portion 21 and having a transversely extending bushing 24 positioned radially inwardly of the trailing end of the band 14. The bushing 24 is pivotally connected to the backing plate 13 by means of an anchor pin 25 having the inboard end secured to the backing plate and having the outboard end projecting beyond the adjacent end of the bushing 24. The bushing 24 is held in assembled relation with the anchor pin and the pivot 22 is retained in place by means of a spring clip 26. The clip 26 is shown in Figure 3 as having the radially inner end engaging within a groove formed in the outboard end of the anchor pin 25 and having the radially outer end apertured to receive a reduced projection 27 on the pivot pin 22.

It follows from the foregoing that the trailing end of the brake band is anchored on the backing plate 13 through the casting 20 embodying the cylinder of the brake actuator 15. In this connection, attention is also directed to the fact that the central portion of the brake band is held into abutting engagement with the backing plate 13 by means of a spring clip 28 having the radially inner end 29 fixed to the backing plate and having the radially outer end 30 engaging the outboard side of the rib 17.

The leading end of the brake band 14 is operatively connected to the piston 19 through the medium of a fixture 31 having the forward end secured to the radially inner surface of the leading end portion of the band and having a rearwardly projecting cylindrical portion 32 extending into the cylinder 18 through the forward end thereof. As shown in Figure 1, the extremity of the cylindrical portion 32 extends within a recess 33 in the adjacent end of the piston 19 and abuts the base of the recess so that movement of the piston relative to the cylinder in a forward direction causes the leading end of the brake band to engage the brake flange 12. It will be observed from Figure 1 that a cup-shaped seal, preferably although not necessarily of rubber, is clamped against the rear end of the piston 19 by means of a spring 34 and cooperates with the rear end portion of the cylinder to form a fluid chamber communicating with a source of hydraulic fluid medium through an intake port, designated in Figure 2 by the reference character 35. The forward end of the cylinder is closed by means of a seal 36 having a flexible ring 37 in the periphery thereof adapted to snap into engagement within an annular groove 38 formed in the cylinder and having a central opening therethrough for receiving the cylindrical projecting portion 32 of the fixture 31. The central opening through the seal is, of course, predetermined so that the marginal edges of the opening frictionally engage the cylindrical portion 32 throughout the circumference thereof and thereby prevent foreign matter from escaping into the cylinder.

From the foregoing construction, it will be noted that the casting 20 is mounted for limited swinging movement in a plane parallel to the plane of rotation of the brake drum and provision is made herein for normally resisting swinging movement of the casting 20 from its released position in the brake drum and for automatically returning the casting to its released position when the brake is released. Upon reference to Figure 2, it will be noted that the above is accomplished by a spring actuated device 40 carried by the backing plate 13 and engageable with a longitudinally extending rib 41 formed on the radially inner side of the casting 20. In detail, the device 40 comprises a casing formed of complementary sheet metal parts 42 secured together to provide an integral construction and having the outboard side 43 seated against the inboard side of the backing plate. The device 40 is secured to the backing plate by means of a fastener element in the form of a headed pin having a shank portion 44 extending through an opening in the backing plate and projecting into the device or casing 40 through an opening in the outboard side 43 of the casing. The outboard side 43 is held into frictional engagement with the backing plate by means of a coil spring 45 housed in the device 40 around the shank 44 with the inboard end abutting the side 43 of the device and with the opposite end engaging a seat 46 slidably mounted on the shank 44 of the pin. The seat 46 is held in assembled relation with the pin 44 by means of a pin 47 extending transversely through the outboard end of the pin 44. It will also be noted from Figure 2 that the complementary sections 42 are provided with juxtapositioned flanges 48 extending in an outboard direction from the device 40 and engaging within a notch 49 formed in the rib 41 of the casting 20 at a point spaced forwardly from the anchor pin 25. Thus, it will be seen that swinging movement of the casting 20 from its released position in the brake drum effects a rocking movement of the device 40 relative to the pin 44 against the action of the spring 45. As a result, the device 40 and particularly the spring 45 will serve to return and yieldably maintain the casting 20 in its released position in the brake drum.

Assuming that the brake drum is rotating in the forward direction indicated by the arrow A in Figure 1 and that the fluid pressure is built up in the cylinder 18 at the rear end of the piston 19, it will be noted that the resulting forward movement of the piston 19 relative to the cylinder 18 is imparted to the leading end of the brake band through the medium of the fixture 31. As the leading end of the brake band is moved into engagement with the brake flange, the brake friction means 16 wraps into engagement with the adjacent surface of the brake flange, but is prevented from locking by reason of the fact that the torque at the trailing end of the band effects a radial inward displacement of the pivot pin 22 or, in other words, causes the casting 20 to swing inwardly about the anchor pin 25. This action will, of course, relieve the friction at the trailing end of the brake band and due to the leverage ratio of the mechanism shown in Figure 1, it will be noted that the leading end of the brake band will move inwardly to a greater extent, with the result that the braking torque is correspondingly reduced. As soon as the pressure at the rear end of the piston 19 is relieved, the device 40 automatically returns the operator 15 to its initial released position and return movement of the brake band to its released position is effected by a spring 50.

The above arrangement is particularly advantageous when brakes of the type described are installed on the road engaging wheels of motor vehicles because it provides for equalizing the braking torque applied to the wheels regardless of variations in the co-efficient of friction of the linings. As a result, effective uniform braking on each of the wheels of the vehicle is insured and the safety factor is, accordingly, increased.

Provision is also made in Figure 1 for adjusting the brake band relative to the brake flange 12 to insure a predetermined clearance, irrespective of wear of the friction lining 16. In the present instance, the brake band is automatically adjusted in dependence upon the wear so that the proper operating clearance is maintained throughout the life of the friction lining 16.

In detail, it will be noted that automatic adjustment is effected by means of a clutch element 51 axially bored to receive the cylindrical portion 32 on the fixture 31 and having the inner surface of the bore ground, or otherwise fashioned, to provide a rocking engagement of the clutch element on the cylindrical portion 32. As shown in Figure 1, the radially inner end 52 of the clutch element 51 abuts the forward end of the cylinder 18 at the radially inner side of the latter and the radially outer end of the clutch element is yieldably urged in a rearward direction by means of a spring 53. In other words, the clutch element is normally held in a position inclined with respect to a plane perpendicular to the axis of the cylindrical portion 32 of the fixture 31 so that relative movement therebetween is prevented. However, a stop 54 is located forwardly beyond the radially inner end of the clutch element 51 a distance approximating the clearance desired between the brake friction lining 16 and the inner surface of the annular brake flange 12. With the above construction, it will be noted that any wear of the friction lining 16 results in a corresponding increase in the forward travel of the piston 19 and, since the clutch element 51 moves as a unit with the piston 19, it follows that the radially inner end of the clutch element will engage the stop 54. Continued movement of the piston 19 in a forward direction will effect a rocking movement of the clutch element 51 in a direction against the action of the spring 53 and thereby permits relative movement between the fixture 31 and the clutch element 51. It follows, therefore, that the clutch element 51 assumes a position on the cylindrical portion 32 closer to the free or rear end of the latter and, as soon as the fluid pressure in the cylinder 18 acting on the rear end of the piston is released, the spring 53 locks the clutch element 51 in its new position on the cylindrical portion 32 of the fixture 31. The spring 50 will, of course, return the leading end of the band to a position wherein the radially inner end 52 of the clutch element 51 abuts the forward end of the cylinder. In this manner, adjustment of the band is automatically effected in dependence upon the wear and the desired clearance is maintained throughout the life of the friction lining 16.

Figure 6:
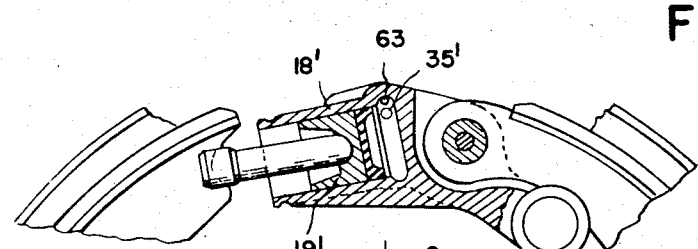
Figure 6 is a fragmentary sectional view illustrating a modified form of construction.
Figure 7:
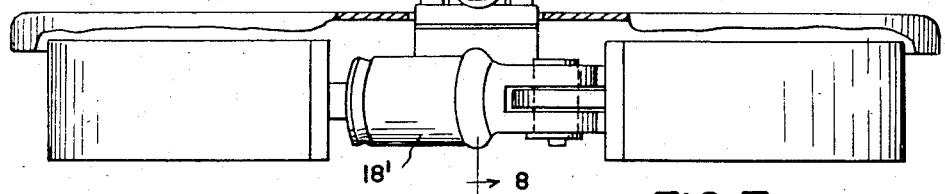
Figure 7 is a plan view of the construction shown in Figure 6.
Figure 8:
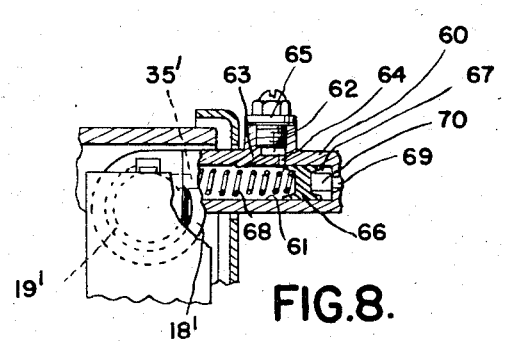
Figure 8 is a sectional view taken substantially on the plane indicated by the line 8—8 of Figure 7.

In Figures 6 to 8, inclusive, I have illustrated a modified form of automatic adjustment for the friction means and this alternative construction is particularly advantageous in cases where a hydraulic actuator is employed. In general, it may be pointed out that the principal difference between the embodiment of the invention shown in Figures 1 to 5, inclusive, and the one illustrated in Figures 6 to 8, inclusive, is that in the latter, adjustment of the friction means relative to the brake flange is accomplished hydraulically instead of mechanically. With the above in view, particular attention is directed to Figure 8 wherein it will be noted that a fixture 60 is secured to the inboard side of the cylinder 18', and this fixture is provided with a bore 61 communicating with the intake port 35' through which the hydraulic fluid medium is discharged into the cylinder. The interior of the bore 61 communicates with a bleed chamber 62 through the medium of a pair of ports 63 and 64 spaced from each other axially of the bore 61. In accordance with conventional practice, the chamber 62 is open at the top to provide for bleeding of the cylinder and the opening is normally closed by a cap 65.

Slidably mounted in the bore 61 is a piston 66 of rubber material having annular oppositely extending projections 67 engaging the inner surface of the bore under compression to provide an effective seal. The piston 66 is normally maintained in its released position inwardly beyond the ports 63 and 64 by means of a spring 68 of sufficient strength to overcome the frictional resistance offered to sliding movement of the piston 66 to its released position and also by means of the head of hydraulic fluid medium trapped between the piston 66 and the piston 19' mounted in the cylinder 18'.

Hydraulic fluid medium is admitted into the bore 61 through the inboard end thereof by means of a port 69 normally closed by a valve member 70 carried by the piston 66 at the inboard side thereof. With this construction, it will be noted that as the hydraulic fluid medium under pressure is admitted to the port 69, the piston 66 is moved toward the cylinder 18' by the action of the fluid medium under pressure on the valve member 70. Inasmuch as a head of fluid medium occupies the space between the piston 66 and the piston 19', it necessarily follows that the pressure in the cylinder 18' at the rear side of the piston 19' is correspondingly increased to move the piston 19' the extent required to engage the brake friction means with the brake flange. Attention is called to the fact at this time that initial movement of the piston 66 in a direction toward the cylinder 18' closes the port 64 and maintains the same closed throughout normal operation. However, when the wear of the friction lining becomes sufficient to require an increased travel of the piston 66 in a direction toward the cylinder 19' a distance sufficient to uncover the port 64, it will be noted that hydraulic fluid medium from the source will bypass around the piston 66 into the space between the latter piston and piston 19'. In other words, the hydraulic fluid medium will flow into the bleed chamber through the port 64 and from the bleed chamber passes into the bore 61 ahead of the piston 66 through the port 63. This has the effect of increasing the head of fluid medium between the piston 66 and the piston 19', with the result that when the brake is released, the excess clearance caused by wear of the friction lining is compensated for.

It may also be pointed out that the above hydraulic adjustment does not interfere with bleeding of the cylinder 19' in that this operation may be effected by merely removing the closure 65 from the chamber 62 when the piston 66 is in its inoperative position shown in Figure 8. The entire space between the piston 66 and the piston 19' may then be bled in the usual way and the closure 65 again secured in place. After the chamber 62 has been closed by the cap 65, the head of fluid medium between the two pistons may be reinstated by causing successive operation of the piston 66.

What I claim as my invention is:

1. In brake mechanism, a brake drum, brake friction means supported within said drum for engagement with the latter and having spaced ends, means for expanding the friction means into engagement with the drum including a movable member engageable with one end of the friction means and effective to move the latter end into engagement with the drum, means actuated by the braking torque to effect movement of the spaced ends of the friction means radially inwardly of the brake drum, and means yieldably resisting radial inward movement of the spaced ends of the friction means.

2. In brake mechanism, a brake drum, a backing plate for the drum, brake friction means supported within said drum for engagement with the latter and having spaced ends, a member located between the ends of the friction means and pivotally connected to one of said ends, an element slidably supported on said member and engageable with the other of said ends of the friction means for moving the latter outwardly into engagement with the brake drum, and means pivotally supporting the member on the backing plate at a point radially inwardly of the pivotal connection of the member with the end aforesaid of the friction means whereby the braking torque applies a radially inward force on the ends of the friction means tending to relieve the braking pressure.

3. In brake mechanism, a brake drum, a backing plate for said drum, a brake band supported on the backing plate within the drum for engagement with the latter and having spaced ends, an actuator for the band including a member located between the ends of the band with one end pivotally connected to one of said ends of the band, an element reciprocably mounted on said member and engageable with the other end of the band for moving the latter end outwardly into engagement with the drum, means pivotally supporting the member on the backing plate providing for inward movement of the ends of the band under the action of the braking torque, and yieldable means resisting movement of said member by the braking torque.

4. In brake mechanism, a brake drum, a backing plate for the brake drum, brake friction means supported on the backing plate within the drum for engagement with the latter and having spaced ends, a hydraulic actuator for the friction means including a cylinder pivotally connected to one end of the friction means and having a piston operatively connected to the other end of the friction means for moving the latter into engagement with the drum, and means pivotally mounting the cylinder on the backing plate at a point so located with respect to the pivotal connection of the cylinder with the friction means to provide for inward movement of the ends of the friction means under the action of the braking torque to relieve the braking pressure of the friction means against the drum.

5. In brake mechanism, a brake drum, a backing plate for said drum, a brake band supported on the backing plate within the drum for engagement with the latter and having spaced ends, a hydraulic actuator for the brake band including a cylinder pivotally connected to one end of the brake band and a piston reciprocably mounted in the cylinder and operatively connected to the other end of the brake band for moving the latter outwardly into engagement with the brake drum, an anchor pin for the brake band pivotally connecting the cylinder to the backing plate at a point predetermined to provide for radial inward swinging movement of the cylinder about the anchor in dependence upon the torque applied to the end of the band pivotally connected to the cylinder, and means engageable with the cylinder for yieldably resisting inward swinging movement of the latter about said anchor pin.

CHARLES A. SAWTELLE.